United States Patent [19]

Roderfeld et al.

[11] Patent Number: 4,741,349
[45] Date of Patent: May 3, 1988

[54] SELF-PROPELLED HARVESTER THRESHER

[75] Inventors: Heinrich Roderfeld; Johannes Dammann, both of Harsewinkel, Fed. Rep. of Germany

[73] Assignee: Claas Ohg, Harsewinkel, Fed. Rep. of Germany

[21] Appl. No.: 921,771

[22] Filed: Oct. 21, 1986

[30] Foreign Application Priority Data

Oct. 25, 1985 [DE] Fed. Rep. of Germany ....... 3537959

[51] Int. Cl.$^4$ .......................... A01F 7/06; A01F 12/44
[52] U.S. Cl. ................... 130/27 T; 130/22 A; 56/16.5
[58] Field of Search ................ 130/27 T, 27 R, 22 A; 56/14.6, 16.5

[56] References Cited

U.S. PATENT DOCUMENTS

| 4,244,380 | 1/1981 | De Pann et al. | 130/27 T |
|---|---|---|---|
| 4,249,542 | 2/1981 | Schuler | 130/27 T |
| 4,497,327 | 2/1985 | Hag et al. | 130/27 T |
| 4,505,279 | 3/1985 | Campbell et al. | 130/27 T |
| 4,528,992 | 7/1985 | Heidjann | 56/14.6 |

Primary Examiner—John Weiss
Attorney, Agent, or Firm—Michael J. Striker

[57] ABSTRACT

A self-propelled harvester thresher, comprising a device for a front product supply, and separating device arranged downstream of product supply device, the separating device extending in a longitudinal direction and operating in accordance with the principle of axial flow, the separating device including at least one rotor and a sieve housing surrounding the rotor and provided with inlet and outlet openings, the housing having a plurality of guiding members arranged parallel to one another and extending in a helical manner, the guiding members extending in a running direction and having front ends as considered in the running direction, the guiding members including at least two groups of guiding members, the front ends of the guiding members of one of the groups of guiding members being offset from the front ends of the other of the groups of the guiding members as considered in the running direction.

4 Claims, 1 Drawing Sheet

SELF-PROPELLED HARVESTER THRESHER

BACKGROUND OF THE INVENTION

The present invention relates to a self-propelled harvester thresher. More particularly, it relates to a harvester thresher with a front supply and a separating and sorting unit extending in a longitudinal direction of the harvester thresher and including a rotor surrounded by a sieve housing with inlet and outlet openings and provided in its upper region with parallel and helical inner guiding members.

Harvester threshers of the above mentioned general type are known in the art. In the known harvester threshers the guiding members or rails serve for actuating the movement of the product stream in an axial direction. In this condition when the product runs onto the guiding rail an instantaneous obstacle [dam] takes place which is directly proportional to the number of the guiding rails, since the harvested product runs simultaneously on end surfaces of all guiding rails. This obstacle or dam during the operation causes torque peaks in the drive which therefore must be correspondingly dimensioned. On the other hand, it has been frequently recognized in practice that the product upstream of the guiding rails is rolled to form small coil which then pass through the harvester thresher and are thrown onto the field. In these individual coils the available grains cannot be separated. This results in high grain losses.

SUMMARY OF THE INVENTION

Accordingly, it is an object of the present invention to provide a harvester thresher of the above mentioned general type, which avoids the disadvantages of the prior art.

More particularly, it is an object of the present invention to provide a harvester thresher of the above type in which during running of the harvested product onto the guiding rails there is only a small obstacle or small accumulation of products.

In keeping with these objects and with others which will become apparent hereinafter, one feature of the present invention resides, briefly stated, in a harvester thresher in which guiding members of the sieve housing of a separating and sorting unit are formed so that front [running-on] ends of two groups of guiding members are offset relative to one another as considered in a longitudinal direction of the guiding members.

When the harvester thresher is designed in accordance with these features, the above described highly advantageous results are obtained.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF A PREFERRED EMBODIMENT

Figure 1:
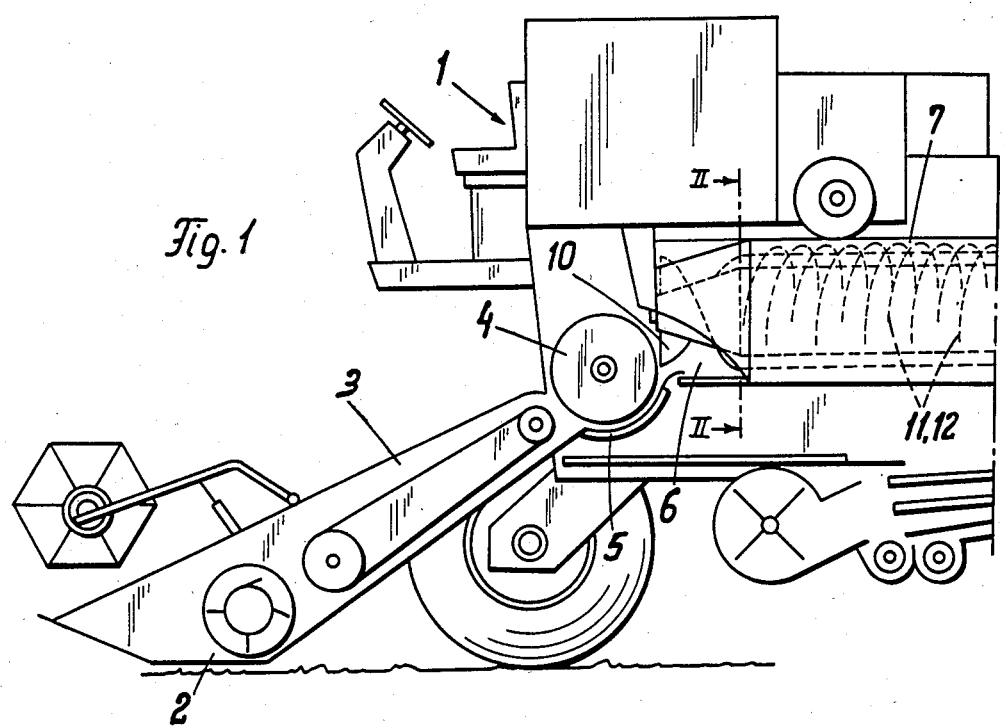
FIG. 1 is a side view of a front part of a harvester thresher in accordance with the present invention.
Figure 2:
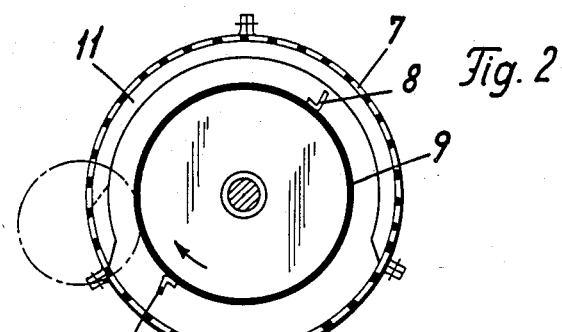
FIG. 2 is a view showing a section of the inventive harvester thresher, taken along the line II—II in FIG. 1.

A self-propelled harvester thresher is identified as a whole with reference numeral 1. It has a cutting trough 2 with an inclined conveyor 3 located after it. A threshing arrangement is located downstream of the inclined conveyor 3 and includes a threshing drum 4 and a threshing basket 5. The threshing arrangement operates in accordance with the principle of tangential flow and receives a harvested product supplied from the inclined conveyor 3.

The straw threshed in the threshing arrangement is thrown by the threshing drum 4 into a receiving opening 6 of a sieve housing 7 which surrounds a separating rotor 9. The separating rotor 9 is provided with a plurality of strips 8. In the region of the receiving opening 6 the separating rotor 9 is conical and provided with a drawing screw sheet 10. The harvested product flowing from the receiving opening 6, rotates helically around the rotor and moves to a not-shown discharging opening. During this path the grain-chaff mixture is separated.

For providing an axial movement component, the sieve housing 7 has in its upper region guiding rails 11 and 12. The guiding rails 11 and 12 extend parallel to one another and run helically. As can be seen particularly from FIG. 3, the guiding rails include two groups of guiding rails A and B which are arranged so that the neighboring guiding rails are offset relative to one another. More particularly, they are offset relative to one another so that the harvested product first runs to front ends 13 of the guiding rails 11 of the group A, and then runs to front ends 14 of the guiding rails 12 of the group B.

When the guiding rails are arranged as described hereinabove, unavoidable torque peaks during running of the product onto the guiding rails are cut approximately in half, since the entire obstacle surface which is equal to the sum of the end surfaces of all guiding rails for running is also cut in half. The end surfaces of the rearwardly offset guiding rails 12 act only as a neglectably small obstacle, since the product has been already lifted by the rails 11.

Figure 3:
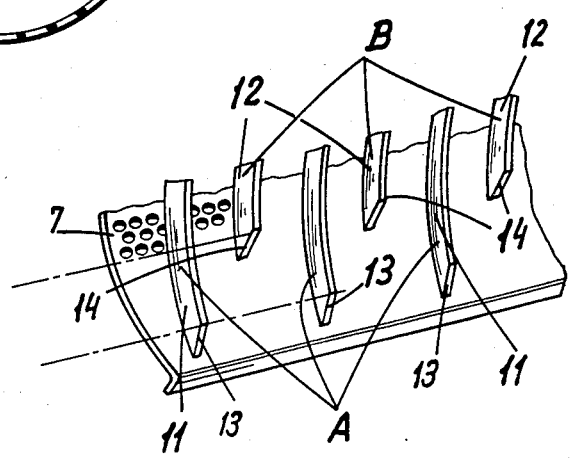
FIG. 3 is a view showing an encircled fragment of FIG. 2, in a perspective showing.

When the guiding rails are designed and arranged as described hereinabove, there is also a further advantage in that the danger of the coil formation no longer takes place by the offset of the guiding rails. In FIG. 3 only the front side [running-on side] of the guiding rails is shown. However, within the basic idea of the invention, the rear side [running-off side] of the rails can also be designed so that a reversible operation is easily possible, when desired in the event of an obstacle formation. Furthermore, the stepped arrangement of the rails on the rear side provides a stepped expansion of the product layer which contributes to mixing of the product.

It will be understood that each of the elements described above, or two or more together, may also find a useful application in other types of constructions differing from the types described above.

While the invention has been illustrated and described as embodied in a self-propelled harvester thresher, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A self-propelled harvester thresher, comprising means for a front product supply; threshing means performing threshing of a product; and separating means arranged downstream of product supply means, said separating means extending in a longitudinal direction and operating in accordance with the principle of axial flow, said separating means including at least one separating rotor and a sieve housing surrounding said separating rotor and provided with inlet and outlet openings, said housing having an upper region provided with a plurality of inner guiding members arranged parallel to one another and extending in a helical manner, said guiding members extending in a running direction and having front ends as considered in said running direction, said guiding members including at least two groups of guiding members, said front ends of the guiding members of one of said groups of guiding members being offset from said front ends of the guiding members of the other of said groups of guiding members as considered in said running direction.

2. A self-propelled harvester thresher as defined in claim 1, wherein said guiding members are arranged so that the guiding members with said offset front ends are arranged in an alternating order relative to one another.

3. A self-propelled harvester thresher as defined in claim 1, wherein said guiding members at least at said front ends have inclined surfaces.

4. A self-propelled harvester thresher as defined in claim 1, wherein said guiding members are formed as guiding rails.

* * * * *